UNITED STATES PATENT OFFICE.

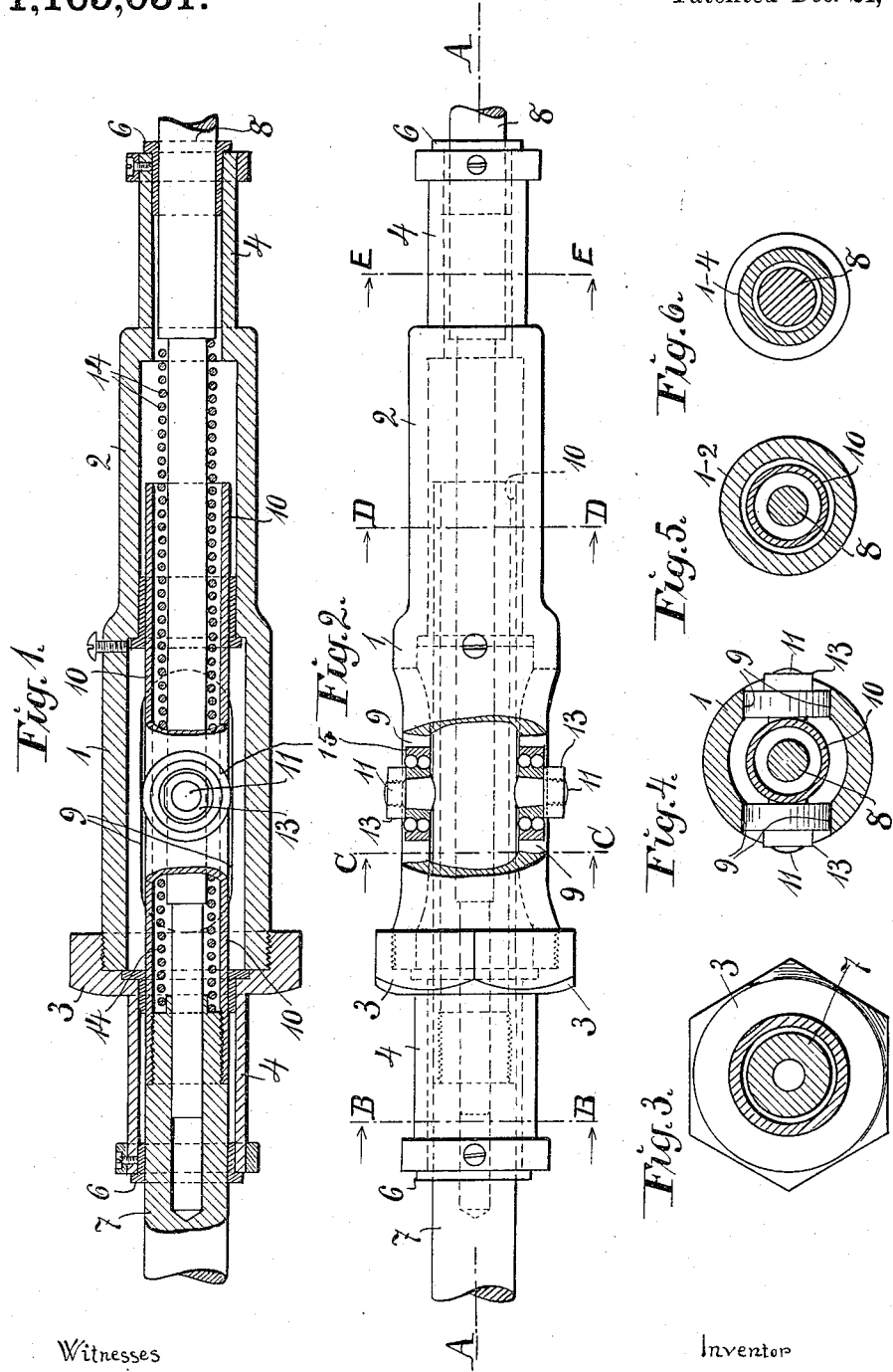

KARL ARTHUR STÅHLNACKE, OF ÖSTERÅS, SWEDEN.

COUPLING FOR SHAFTS.

1,165,031.   Specification of Letters Patent.   Patented Dec. 21, 1915.

Application filed April 10, 1913. Serial No. 760,278.

*To all whom it may concern:*

Be it known that I, KARL ARTHUR STÅHLNACKE, a subject of the King of Sweden, and resident of Österås, Bergvik, in the Kingdom of Sweden, have invented certain new and useful Improvements in Couplings for Shafts, of which the following is a specification, reference being had therein to the accompanying drawing.

This invention relates to couplings for shafts and the like, so arranged that the shaft, at the same time as it rotates, can move longitudinally and exert a yielding pressure in the said direction. The invention especially relates to shafts actuating the rotary peeling organ of peeling machines, which organ must bear against the log with a certain pressure longitudinally of the driving shaft and at the same time be adjusted automatically with relation to the unevennesses of the log. The invention may, however, be applied also to other shafts operating in a similar manner.

In the accompanying drawing Figure 1 shows the coupling in a longitudinal section on the line A to A of Fig. 2. Fig. 2 is a side view partially in section of the coupling. Figs. 3 to 6 inclusive are cross sections on the lines B to B, C to C and D to D respectively of Fig. 2.

In the tubular end of the shaft 7 a piston, plunger 8 or the like is slid, and a compressible spiral spring 14 is located between the said plunger and the shaft 7. The shaft 7 and the plunger 8 are inclosed by a sleeve made longitudinally in two pieces 1 and 3, which are in screw-threaded engagement one with the other. The said sleeve is journaled in bearings; only the bearing surfaces of the sleeve but not the bearings are shown in the drawing. The power, rotating the shaft is applied to the said sleeve. A sleeve 10, forming an extension of the shaft 7 and in screw-threaded engagement with the same, incloses the spiral spring 14 and is provided with two lateral pins or projections 11, 11 located diametrically opposite to each other. The said pins 11, 11 extend into recesses or slots 9, 9, provided in the sleeve 1, 3 and extending longitudinally of the same. On the pins 11, 11 rings or rollers 15 are provided with interposed balls. The said rings fit in the slots 9, 9. Nuts 13 in screw-threaded engagement with the pins retain the rings on the same. In the ends of the sleeve 1, 3 suitable bushes 6 or the like are provided tightly inclosing the shaft 7 and the plunger 8 without preventing the said parts from moving longitudinally.

As stated above, the rotating power is applied to the sleeve 1, 3, acting for instance on a pulley, toothed wheel or the like fixed to the sleeve at 2. The sleeve 1, 3, when rotating, carries with itself the shaft 7 by means of the pins 11, 11. The plunger 8, which does not rotate, is acted upon by some exterior force for instance a spring, steam-, air- or water-pressure or the like in such direction, that the spring 14 is compressed to a greater or less extent, which pressure is thus transmitted in a yielding manner to the shaft 7, to which the peeling disk, the tool, etc., is fixed. When the shaft is not subjected to any counter pressure the plunger 8 and the spring 14 move the shaft 7 to its outermost position, determined by the pins 11, 11 engaging the left ends of the slots 9, 9. As the shaft is subjected to a sufficiently great counter pressure, the pins are moved in the slots 9, 9, until equilibrium is effected. The movement of the pins is varied by increasing or decreasing the pressure applied to the plunger, the maximum movement being equal to the length of the slots 9, 9. The spiral spring alone may be used as the expanding force acting upon the shaft, longitudinally of the same, in which case the plunger is stationary. The said force is then dependent exclusively upon the spring. Preferably an end thrust ball bearing not shown, is provided between the end of the spring 14 and the shaft 7 or between the end of the spring 14 and the plunger 8 for facilitating the rotary movement of the shaft.

Having now described my invention, what I claim as new and desire to secure by Letters Patent is:

In a coupling for rotary shafts the combination with a sleeve sliding on the shaft, to which sleeve the driving power is applied, means causing the shaft to rotate with the said sleeve, while permitting simultaneously the shaft and the sleeve to slide with relation to each other, of a plunger inclosed by and sliding in the sleeve, a spring arranged between the plunger and the shaft, effecting an end thrust on the shaft.

In witness whereof, I have hereunto signed my name in the presence of two subscribing witnesses.

KARL ARTHUR STÅHLNACKE.

Witnesses:
MARGARET PRIEN,
GUSTAF TSFATT.